United States Patent
Srivastav et al.

(10) Patent No.: US 12,548,196 B2
(45) Date of Patent: Feb. 10, 2026

(54) GENERATING IMAGE METADATA USING A COMPACT COLOR SPACE

(71) Applicant: Adobe Inc., San Jose, CA (US)

(72) Inventors: Nimish Srivastav, Santa Clara, CA (US); Shankar Venkitachalam, Santa Clara, CA (US); Satya Deep Maheshwari, Noida (IN); Mihir Naware, Redwood City, CA (US); Deepak Pai, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 349 days.

(21) Appl. No.: 18/140,543

(22) Filed: Apr. 27, 2023

(65) Prior Publication Data
US 2024/0362821 A1    Oct. 31, 2024

(51) Int. Cl.
   *G06T 7/90*    (2017.01)
   *G06T 5/40*    (2006.01)
   *G06V 10/25*   (2022.01)
   *G06V 10/56*   (2022.01)

(52) U.S. Cl.
   CPC .......... *G06T 7/90* (2017.01); *G06T 5/40* (2013.01); *G06V 10/25* (2022.01); *G06V 10/56* (2022.01); *G06T 2207/10024* (2013.01)

(58) Field of Classification Search
   CPC ... G06T 7/90; G06T 5/40; G06T 2207/10024; G06T 11/001; G06T 2207/20081; G06T 2207/20084; G06V 10/25; G06V 10/56
   See application file for complete search history.

(56) References Cited

U.S. PATENT DOCUMENTS

| | | |
|---|---|---|
| 8,510,644 B2 | 8/2013 | Rajkumar et al. |
| 9,760,631 B1 | 9/2017 | Broxton et al. |
| 9,904,661 B2 | 2/2018 | Gorelik et al. |
| 10,466,869 B2 | 11/2019 | Liu |
| 10,909,604 B1 | 2/2021 | Zappella |
| 11,392,751 B1 | 7/2022 | Szarvas et al. |
| 11,907,508 B1 | 2/2024 | Kumar et al. |
| 12,124,683 B1 | 10/2024 | Kumar et al. |
| 12,475,622 B2 | 11/2025 | Kumar et al. |

(Continued)

OTHER PUBLICATIONS

"Non-Final Office Action", U.S. Appl. No. 18/304,534, filed Mar. 5, 2025, 37 pages.

(Continued)

*Primary Examiner* — Duy M Dang
(74) *Attorney, Agent, or Firm* — FIG. 1 Patents

(57) ABSTRACT

In implementations of systems for generating image metadata using a compact color space, a computing device implements a color system to receive input data describing pixels of a digital image and corresponding RGB values of the pixels. The color system assigns a color of a compact color space to each of the pixels based on the corresponding RGB values of the pixels. The compact color space includes a subset of colors included in an RGB color space. The color system computes a histogram of colors of the compact color space and determines a particular color of the compact color space based on the histogram. The color system generates color metadata for the digital image describing a natural language name of the particular color of the compact color space.

20 Claims, 10 Drawing Sheets
(5 of 10 Drawing Sheet(s) Filed in Color)

(56) References Cited

U.S. PATENT DOCUMENTS

| | | |
|---|---|---|
| 2013/0179217 A1 | 7/2013 | Newton |
| 2015/0302755 A1 | 10/2015 | Breck et al. |
| 2016/0103904 A1 | 4/2016 | Greenberg et al. |
| 2016/0171511 A1 | 6/2016 | Goel et al. |
| 2017/0070785 A1 | 3/2017 | Zou |
| 2017/0140249 A1 | 5/2017 | Lee et al. |
| 2020/0107072 A1 | 4/2020 | Lomada et al. |
| 2020/0360794 A1 | 11/2020 | Intonato et al. |
| 2021/0004670 A1 | 1/2021 | Tripathi et al. |
| 2021/0019567 A1 | 1/2021 | Gandhi et al. |
| 2021/0073583 A1 | 3/2021 | Dagan et al. |
| 2021/0081470 A1 | 3/2021 | Fisher et al. |
| 2021/0089570 A1 | 3/2021 | Hunter et al. |
| 2021/0117736 A1 | 4/2021 | Merler et al. |
| 2021/0209425 A1 | 7/2021 | Nataraj et al. |
| 2021/0281650 A1 | 9/2021 | George et al. |
| 2021/0373726 A1 | 12/2021 | Boyd et al. |
| 2022/0027176 A1 | 1/2022 | Mclachlan et al. |
| 2022/0036064 A1 | 2/2022 | Wang et al. |
| 2022/0114207 A1* | 4/2022 | Kawabata ............. G06F 16/583 |
| 2022/0114326 A1 | 4/2022 | Bedi et al. |
| 2022/0198951 A1 | 6/2022 | Carroll et al. |
| 2023/0070390 A1 | 3/2023 | Weng et al. |
| 2023/0188792 A1 | 6/2023 | Sahasi et al. |
| 2023/0325944 A1 | 10/2023 | Dejoux et al. |
| 2024/0104338 A1 | 3/2024 | Gong et al. |
| 2024/0177512 A1 | 5/2024 | Gils et al. |
| 2024/0345707 A1 | 10/2024 | Kumar et al. |
| 2024/0355020 A1 | 10/2024 | Kumar et al. |

OTHER PUBLICATIONS

"Colour metric", Thiadmer Riemersma, CompuPhase [retrieved Apr. 24, 2023]. Retrieved from the Internet <https://www.compuphase.com/cmetric.htm>., May 23, 2019, 5 Pages.

"Earn for your writing", Medium [retrieved Dec. 1, 2022]. Retrieved from the Internet <https://medium.com/earn>., 4 Pages.

"medium.com SEO Analysis & Statistics", SEOMoz, Inc. [retrieved Dec. 1, 2022]. Retrieved from the Internet <https://moz.com/domain-analysis/medium.com>., 5 Pages.

"Sensational Color", Kate Smith LLC [retrieved Apr. 24, 2023]. Retrieved from the Internet <https://www.sensationalcolor.com/color-temperature/>., 9 Pages.

"Twitter Usage Statistics", Internet Live Stats [retrieved Dec. 6, 2022]. Retrieved from the Internet <https://www.internetlivestats.com/twitter-statistics/>., 8 Pages.

"What is Medium", Medium [retrieved Dec. 1, 2022]. Retrieved from the Internet <https://medium.com/about>., 6 Pages.

"YouTube for Press", Youtube Official Blog [retrieved Dec. 6, 2022]. Retrieved from the Internet <https://blog.youtube/press/>., 11 Pages.

Athey, Susan , "Beyond prediction: Using big data for policy problems", Science, vol. 355, No. 6324 [retrieved Dec. 1, 2022]. Retrieved from the Internet <https://scholar.harvard.edu/files/people_analytics/files/beyond_prediction.pdf>., Feb. 2017, 4 Pages.

Bandari, Roja et al., "The Pulse of News in Social Media: Forecasting Popularity", Cornell University arXiv, arXiv.org [retrieved Dec. 1, 2022]. Retrieved from the Internet <https://arxiv.org/pdf/1202.0332.pdf>., Feb. 2, 2012, 8 Pages.

Beltagy, Iz et al., "Longformer: The Long-Document Transformer", Cornell University arXiv, arXiv.org [retrieved Dec. 1, 2022]. Retrieved from the Internet <https://arxiv.org/pdf/2004.05150.pdf>., Dec. 2, 2020, 17 Pages.

Botticello, Casey , "How Much Money Can You Make Writing for Medium?", Blogging Guide [retrieved Dec. 1, 2022]. Retrieved from the Internet <https://medium.com/blogging-guide/how-much-money-can-you-make-writing-for-medium-a3cf0c9c7533>., Aug. 18, 2018, 24 Pages.

Callegaro, Mario et al., "The role of surveys in the era of "big data"", in: The Palgrave handbook of Survey Research, Palgrave Macmillan [retrieved Dec. 1, 2022]. Retrieved from the Internet <https://doi.org/10.1007/978-3-319-54395-6>., Jan. 22, 2018, 19 Pages.

Edwards, Jim , "$132 million later, Ev Williams says he is raising even more money for Medium", Business Insider India [online] [retrieved Dec. 1, 2022]. Retrieved from the Internet <https://www.businessinsider.in/lyft-removed-the-option-to-split-ride-fares-with-other-passengers-but-says-an-easier-option-is-coming-soon/articleshow/66548306.cms>., Nov. 9, 2018, 35 Pages.

Egami, Naoki et al., "How to Make Causal Inferences Using Texts", Cornell University arXiv, arXiv.org [retrieved Dec. 1, 2022]. Retrieved from the Internet <https://arxiv.org/pdf/1802.02163.pdf>., Feb. 6, 2018, 47 Pages.

Feng, Jean et al., "Sparse-Input Neural Networks for High-dimensional Nonparametric Regression and Classification", Cornell University arXiv, arXiv.org [retrieved Dec. 1, 2022]. Retrieved from the Internet <https://arxiv.org/pdf/1711.07592.pdf>., Jun. 21, 2019, 37 Pages.

Gangl, Markus , "Causal inference in sociological research", Annual Review of Sociology, vol. 36 [retrieved Dec. 13, 2022]. Retrieved from the Internet <https://doi.org/10.1146/annurev.soc.012809.102702>., Oct. 2010, 30 Pages.

Gelli, Francesco et al., "Image Popularity Prediction in Social Media Using Sentiment and Context Features", MM '15: Proceedings of the 23rd ACM international conference on Multimedia [retrieved Dec. 1, 2022]. Retrieved from the Internet <https://asset-pdf.scinapse.io/prod/2090059852/2090059852.pdf>., Oct. 13, 2015, 4 Pages.

Hagar, Nick et al., "Optimizing Content with A/B Headline Testing: Changing Newsroom Practices", Media and Communication, vol. 7, No. 1 [retrieved Dec. 1, 2022]. Retrieved from the Internet <https://pdfs.semanticscholar.org/f3fb/92658537d7a6c5a552300fd0ff70366b6941.pdf>., Feb. 19, 2019, 11 Pages.

Hair, Joseph et al., "Data, measurement, and causal inferences in machine learning: opportunities and challenges for marketing", Journal of Marketing Theory and Practice vol. 29 [retrieved Dec. 1, 2022]. Retrieved from the Internet <https://doi.org/10.1080/10696679.2020.1860683>., Jan. 11, 2021, 13 Pages.

Hessel, Jack et al., "Something's Brewing! Early Prediction of Controversy-causing Posts from Discussion Features", Cornell University arXiv, arXiv.org [retrieved Dec. 1, 2022]. Retrieved from the Internet <https://arxiv.org/pdf/1904.07372.pdf>., May 14, 2019, 12 Pages.

Hofman, Jake et al., "Integrating explanation and prediction in computational social science", Nature, vol. 595 [retrieved Dec. 1, 2022]. Retrieved from the Internet <http://www.eliassi.org/explanation-vs-prediction.pdf>., Jun. 30, 2021, 8 Pages.

Hofman, Jake et al., "Prediction and explanation in social systems", Science, vol. 355, No. 6324 [retrieved Dec. 1, 2022]. Retrieved from the Internet <http://faculty.washington.edu/jwilker/559/prediction.pdf>., Feb. 3, 2017, 4 Pages.

Holland, Paul , "Statistics and causal inference", Journal of the American Statistical Association, vol. 81 [retrieved Dec. 1, 2022]. Retrieved from the Internet <http://www.fitelson.org/woodward/holland.pdf>., Mar. 12, 2012, 16 Pages.

Holliman, Geraint et al., "Business to business digital content marketing: marketers' perceptions of best practice", Journal of Research in Interactive Marketing [retrieved Dec. 1, 2022]. Retrieved from the Internet <https://e-space.mmu.ac.uk/579029/2/B2BContentMarketingJRIMREV11052014editsoffSUB.pdf>., Oct. 7, 2014, 32 Pages.

Howard, Rob , "I just made $76 writing for Medium members. Here's what I learned . . . ", Medium [online] [retrieved Dec. 1, 2022]. Retrieved from the Internet <https://medium.com/the-mission/i-just-made-76-writing-for-medium-members-heres-what-i-learned-9cbb85abfc36>., Sep. 11, 2017, 5 Pages.

Huang, Jianyi , "Predicting the active period of popularity evolution: A case study on Twitter hashtags", Information Sciences, vol. 512 [retrieved Dec. 13, 2022]. Retrieved from the Internet <https://doi.org/10.1016/j.ins.2019.04.028>., Feb. 1, 2020, 12 Pages.

Huang, Ming-Hui et al., "A strategic framework for artificial intelligence in marketing", Journal of the Academy of Marketing

(56) References Cited

OTHER PUBLICATIONS

Science, vol. 49, No. 1 [retrieved Dec. 1, 2022]. Retrieved from the Internet <10.1007/s11747-020-00749-9>., Jan. 2021, 22 Pages.

Hulland, John et al., "Marketing survey research best practices: evidence and recommendations from a review of JAMS articles", Journal of the Academy of Marketing Science [retrieved Dec. 1, 2022]. Retrieved from the Internet <http://www.personal.psu.edu/jxb14/IPSS/materials/Hullandetal2017.pdf>., Apr. 10, 2017, 17 Pages.

Hünermund, Paul et al., "Causal Machine Learning and Business Decision Making", [retrieved Dec. 1, 2022]. Retrieved from the Internet <https://papers.ssrn.com/sol3/papers.cfm?abstract_id=3867326>., Feb. 19, 2022, 52 Pages.

Hutto, C et al., "VADER: A Parsimonious Rule-Based Model for Sentiment Analysis of Social Media Text", vol. 8 No. 1 (2014): Eighth International AAAI Conference on Weblogs and Social Media [retrieved Dec. 1, 2022]. Retrieved from the Internet <https://ojs.aaai.org/index.php/ICWSM/article/view/14550/14399>., May 16, 2014, 10 Pages.

Imbens, Guido et al., "Causal Inference for Statistics, Social, and Biomedical Sciences", Cambridge University Press, New York [retrieved Dec. 1, 2022]. Retrieved from the Internet <https://wiki.swarma.org/images/5/54/-Guido_W._Imbens%2C_Donald_B._Rubin-_Causal_Inferenc%28z-lib.org%29.pdf>., 2015, 646 Pages.

Joo, Jungseock et al., "Automated Facial Trait Judgment and Election Outcome Prediction: Social Dimensions of Face", IEEE International Conference on Computer Vision (ICCV) [retrieved Dec. 1, 2022]. Retrieved from the Internet <http://www.stat.ucla.edu/~sczhu/papers/Conf_2015/face_trait_ICCV15.pdf>., Dec. 7, 2015, 9 Pages.

Keuschnigg, Marc et al., "Analytical sociology and computational social science", Journal of Computational Social Science, vol. 1, No. 1 [retrieved Dec. 1, 2022]. Retrieved from the Internet <https://asset-pdf.scinapse.io/prod/2768731445/2768731445.pdf>., Feb. 12, 2018, 12 Pages.

Koç, Ali Aydin et al., "A comparative study of Artificial Neural Networks and Logistic Regression for classification of marketing campaign results", Mathematical and Computational Applications, vol. 18, No. 3 [retrieved Dec. 1, 2022]. Retrieved from the Internet <https://pdfs.semanticscholar.org/eca3/aab293fbe911ce8b9a8af7bf6431e695c398.pdf>., 2013, 7 Pages.

Koch, Bernard et al., "Deep Learning of Potential Outcomes", Cornell University arXiv, arXiv.org [retrieved Dec. 1, 2022]. Retrieved from the Internet <https://arxiv.org/pdf/2110.04442.pdf>., Oct. 9, 2021, 51 Pages.

Koiso-Kanttila, Nina , "Digital Content Marketing: A Literature Synthesis", Journal of Marketing Management vol. 20 [retrieved Dec. 13, 2022]. Retrieved from the Internet <https://doi.org/10.1362/026725704773041122>., Aug. 9, 2010, 23 Pages.

Kumar, Yaman et al., "US Application as Filed", U.S. Appl. No. 18/304,534, filed Apr. 21, 2023, 61 pages.

Kumar, Yaman et al., "US Application as Filed", U.S. Appl. No. 18/133,725, 04/12/20230, 73 pages.

Ma, Liye et al., "Machine learning and AI in marketing—Connecting computing power to human insights", International Journal of Research in Marketing, vol. 37, No. 3 [retrieved Dec. 1, 2022]. Retrieved from the Internet <https://www.ckgsb.edu.cn/uploads/professor/202008/14/Ma_Sun_2020.pdf>., Aug. 2020, 24 Pages.

Moniz, Nuno et al., "A review on web content popularity prediction: Issues and open challenges", Online Social Networks and Media, vol. 12 [retrieved Dec. 1, 2022]. Retrieved from the Internet <doi.org/10.1016/j.osnem.2019.05.002>., https://www.researchgate.net/profile/Nuno-Moniz/publication/333728102_A_Review_on_Web_Content_Popularity_Prediction_Issues_and_Open_Challenges/links/5d00ffb9a6fdccd13095860d/A-Review-on-Web-Content-Popularity-Prediction-Issues-and-Open-Challenges.pdf, Jun. 12, 2019, 57 Pages.

Obermeyer, Ziad , "Dissecting racial bias in an algorithm used to manage the health of populations", Science, vol. 366, No. 6464 [retrieved Dec. 1, 2022]. Retrieved from the Internet <https://www.snowdropsolution.com/pdf/Dissecting%20Racial%20Bias%20In%20An%20Algorithm%20Used%20To%20Manage%20The%20Health%20Of%20Populations.pdf>., Oct. 2019, 8 Pages.

Opreana, Alin et al., "A New Development in Online Marketing: Introducing Digital Inbound Marketing", Expert Journal of Marketing, vol. 3, No. 1 [retrieved Dec. 1, 2022]. Retrieved from the Internet <https://marketing.expertjournals.com/ark:/16759/EJM_305opreana29-34.pdf>, Aug. 10, 2015, 6 Pages.

Pearl, Judea , "Causality", Cambridge University Press, New York, NY [retrieved Dec. 7, 2022]. Retrieved from the Internet <https://doi.org/10.1017/CBO9780511803161>., Mar. 2000, 200 Pages.

Petrovic, Sasa et al., "RT to Win! Predicting Message Propagation in Twitter", In International Conference on Weblogs and Social Media (ICWSM) [retrieved Dec. 5, 2022]. Retrieved from the Internet <http://cs.wellesley.edu/~trails/retweetpapers/papers/RTToWin.pdf>., May 11, 2011, 4 pages.

Pinto, Henrique et al., "Using early view patterns to predict the popularity of youtube videos", WSDM '13: Proceedings of the sixth ACM international conference on Web search and data mining [retrieved Dec. 5, 2022]. Retrieved from the Internet <https://doi.org/10.1145/2433396.2433443>., https://www.researchgate.net/profile/Marcos-Goncalves-9/publication/266653405_Using_early_view_patterns_to_predict_the_popularity_of_YouTube_videos/links/54b7a2e30cf2bd04be33b2b3/Using-early-view-patterns-to-predict-the-popularity-of-YouTube-videos.pdf, Feb. 4, 2013, 10 Pages.

Proskurnia, Julia et al., "Predicting the Success of Online Petitions Leveraging Multidimensional Time-Series", WWW '17: Proceedings of the 26th International Conference on World Wide Web [retrieved Dec. 5, 2022]. Retrieved from the Internet <https://exascale.info/assets/pdf/www_2017_p755.pdf>., Apr. 3, 2017, 10 Pages.

Pryor, J.J. , "How Many Stories Are Published on Medium Each Month?", Medium [online] [retrieved Dec. 5, 2022]. Retrieved from the Internet <https://medium.com/feedium/how-many-stories-are-published-on-medium-each-month-fe4abb5c2ac0>., Sep. 14, 2020, 10 Pages.

Pryzant, Reid et al., "Interpretable Neural Architectures for Attributing an Ad's Performance to its Writing Style", Proceedings of the 2018 EMNLP Workshop BlackboxNLP: Analyzing and Interpreting Neural Networks for NLP [retrieved Dec. 6, 2022]. Retrieved from the Internet <https://aclanthology.org/W18-5415.pdf>., Nov. 2018, 11 Pages.

Radford, Alec et al., "Learning Transferable Visual Models From Natural Language Supervision", Cornell University arXiv, arXiv.org [retrieved Jun. 29, 2023]. Retrieved from the Internet <https://arxiv.org/pdf/2103.00020.pdf>., Feb. 26, 2021, 48 Pages.

Robert, Rose et al., "Managing Content Marketing: The Real-World Guide for Creating Passionate Subscribers to Your Brand", Content Marketing Institute [retrieved Jan. 11, 2023]. Retrieved from the Internet <https://books.google.com/books/about/Managing_Content_Marketing.html?id=PiPgXwAACAAJ>., Aug. 29, 2011, 209 Page.

Rubin, Donald , "Causal Inference Using Potential Outcomes: Design, Modeling, Decisions", Journal of the American Statistical Association, American Statistical Association, vol. 100 [retrieved Dec. 6, 2022]. Retrieved from the Internet <http://www.stat.unipg.it/stanghellini/rubinjasa2005.pdf>., Mar. 2005, 10 Pages.

Rubin, Donald , "Estimating causal effects of treatments in randomized and nonrandomized studies", Journal of Educational Psychology, vol. 66, No. 5 [retrieved Dec. 6, 2022]. Retrieved from the Internet <https://web.archive.org/web/20190224065551id_/http://pdfs.semanticscholar.org/5451/22e2990590524459ec9b59ccac6ce71e3b6a.pdf>., Oct. 1974, 14 Pages.

Runge, Jakob et al., "Escaping the curse of dimensionality in estimating multivariate transfer entropy", Physical Review Letters [retrieved Dec. 6, 2022]. Retrieved from the Internet <https://www.pik-potsdam.de/members/kurths/publikationen/2012/rungeprl108.pdf>., Jun. 2012, 5 Pages.

Shrikumar, Avanti , "Not Just a Black Box: Learning Important Features Through Propagating Activation Differences", Cornell University arXiv, arXiv.org [retrieved Dec. 6, 2022]. Retrieved from the Internet <https://arxiv.org/pdf/1605.01713.pdf>., Apr. 11, 2017, 6 Pages.

(56) References Cited

OTHER PUBLICATIONS

Sundararajan, Mukund et al., "Axiomatic Attribution for Deep Networks", Proceedings of the 34th International Conference on Machine Learning [retrieved Dec. 6, 2022]. Retrieved from the Internet <https://mit6874.github.io/assets/misc/sundararajan.pdf>., Jun. 13, 2017, 11 pages.

Talebi, Hossein et al., "NIMA: Neural Image Assessment", Cornell University arXiv, arXiv.org [retrieved Dec. 6, 2022]. Retrieved from the Internet <https://arxiv.org/pdf/1709.05424.pdf>., Apr. 26, 2018, 15 Pages.

Tang, Xiangyun et al., "Fully Exploiting Cascade Graphs for Real-time Forwarding Prediction", AAAI Technical Track on Application Domains vol. 35 No. 1 [retrieved Dec. 6, 2022]. Retrieved from the Internet <https://ojs.aaai.org/index.php/AAAI/article/view/16137>., May 18, 2021, 9 Pages.

Tank, Alex et al., "Neural Granger Causality", Cornell University arXiv, arXiv.org [retrieved Dec. 6, 2022]. Retrieved from the Internet <https://arxiv.org/pdf/1802.05842.pdf>., Mar. 13, 2021, 14 Pages.

Tatar, Alexandru et al., "A survey on predicting the popularity of web content", Journal of Internet Services and Applications vol. 5, No. 1 [retrieved Dec. 6, 2022]. Retrieved from the Internet <https://jisajournal.springeropen.com/counter/pdf/10.1186/s13174-014-0008-y.pdf>., Mar. 2015, 20 Pages.

Tatar, Alexandru , "Predicting the popularity of online articles based on user comments", Proceedings of the International Conference on Web Intelligence, Mining and Semantics [retrieved Dec. 6, 2022]. Retrieved from the Internet <https://doi.org/10.1145/1988688.1988766>., May 25, 2011, 8 Pages.

Varian, Hal , "Causal inference in economics and marketing", Proceedings of the National Academy of Sciences of the United States of America [retrieved Dec. 6, 2022]. Retrieved from the Internet <https://cdsbasel.github.io/dataanalytics/assets/pdf/Varian2016.pdf>., May 25, 2016, 6 Pages.

Veitch, Victor et al., "Adapting text embeddings for causal inference", Cornell University arXiv, arXiv.org [retrieved Dec. 6, 2022]. Retrieved from the Internet <https://arxiv.org/pdf/1905.12741.pdf>., Jul. 25, 2020, 10 Pages.

Wager, Stefan et al., "High-dimensional regression adjustments in randomized experiments", Cornell University arXiv, arXiv.org [retrieved Dec. 6, 2022]. Retrieved from the Internet <https://arxiv.org/pdf/1607.06801.pdf>., Oct. 27, 2016, 23 Pages.

Wang, Jiahao et al., "Will You Ever Become Popular? Learning to Predict Virality of Dance Clips", ACM Transactions on Multimedia Computing, Communications, and Applications, vol. 18, No. 2 [retrieved Dec. 6, 2022]. Retrieved from the Internet <https://arxiv.org/pdf/2111.03819.pdf>., Feb. 16, 2022, 23 Pages.

Wang, Tan et al., "Causal attention for unbiased visual recognition", Cornell University arXiv, arXiv.org [retrieved Dec. 6, 2022]. Retrieved from the Internet <https://arxiv.org/pdf/2108.08782.pdf>., Aug. 19, 2021, 18 Pages.

Wood-Doughty, Zach et al., "Challenges of using text classifiers for causal inference", Cornell University arXiv, arXiv.org [retrieved Dec. 6, 2022]. Retrieved from the Internet <https://arxiv.org/pdf/1810.00956.pdf>., Oct. 1, 2018, 13 Pages.

Xie, Jiayi et al., "Micro-video Popularity Prediction via Multimodal Variational Information Bottleneck", IEEE Transactions on Multimedia [retrieved Dec. 13, 2022]. Retrieved from the Internet <https://ieeexplore.ieee.org/abstract/document/9576573>., Oct. 15, 2021, 14 Pages.

Yang, Yang et al., "A named entity topic model for news popularity prediction", Knowledge-Based Systems, vol. 208 [retrieved Dec. 13, 2022]. Retrieved from the Internet <https://www.sciencedirect.com/science/article/abs/pii/S0950705120305591>., Nov. 15, 2020, 12 Pages.

Zhou, Fan , "A survey of information cascade analysis: Models, predictions, and recent advances", ACM Comput. Surv., vol. 54, No. 2 [retrieved Dec. 6, 2022]. Retrieved from the Internet <https://researchain.net/archives/pdfreader/A-Survey-Of-Information-Cascade-Analysis-Models-Predictions-And-Recent-Advances-2229179>., Mar. 24, 2021, 43 Pages.

U.S. Appl. No. 18/409,638 , "Notice of Allowance", U.S. Appl. No. 18/409,638, Sep. 5, 2024, 16 pages.

U.S. Appl. No. 18/133,725 , "Notice of Allowance", U.S. Appl. No. 18/133,725, Dec. 27, 2023, 11 pages.

"Corrected Notice of Allowability", U.S. Appl. No. 18/304,534, filed Oct. 20, 2025, 2 pages.

\* cited by examiner

GENERATING IMAGE METADATA USING A COMPACT COLOR SPACE

BACKGROUND

Color spaces define vast numbers of colors which are visually perceivable by humans. For example, an RGB color space defines more than 16 million different colors. In the RGB color space, individual colors are identified using a hexadecimal number or code such as "0xf00f0f" which is commonly perceived as "red."

SUMMARY

Techniques and systems for generating image metadata using a compact color space are described. In an example, a computing device implements a color system to receive input data describing pixels of a digital image and corresponding RGB values of the pixels. The color system assigns a color of a compact color space to each of the pixels based on the corresponding RGB values of the pixels. For example, the compact color space includes a subset of colors included in an RGB color space.

The color system computes a histogram of colors of the compact color space assigned to the pixels. A particular color of the compact color space is determined based on the histogram. In one example, the particular color has a maximum distribution in the histogram. The color system generates metadata for the digital image describing a natural language name of the particular color of the compact color space.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
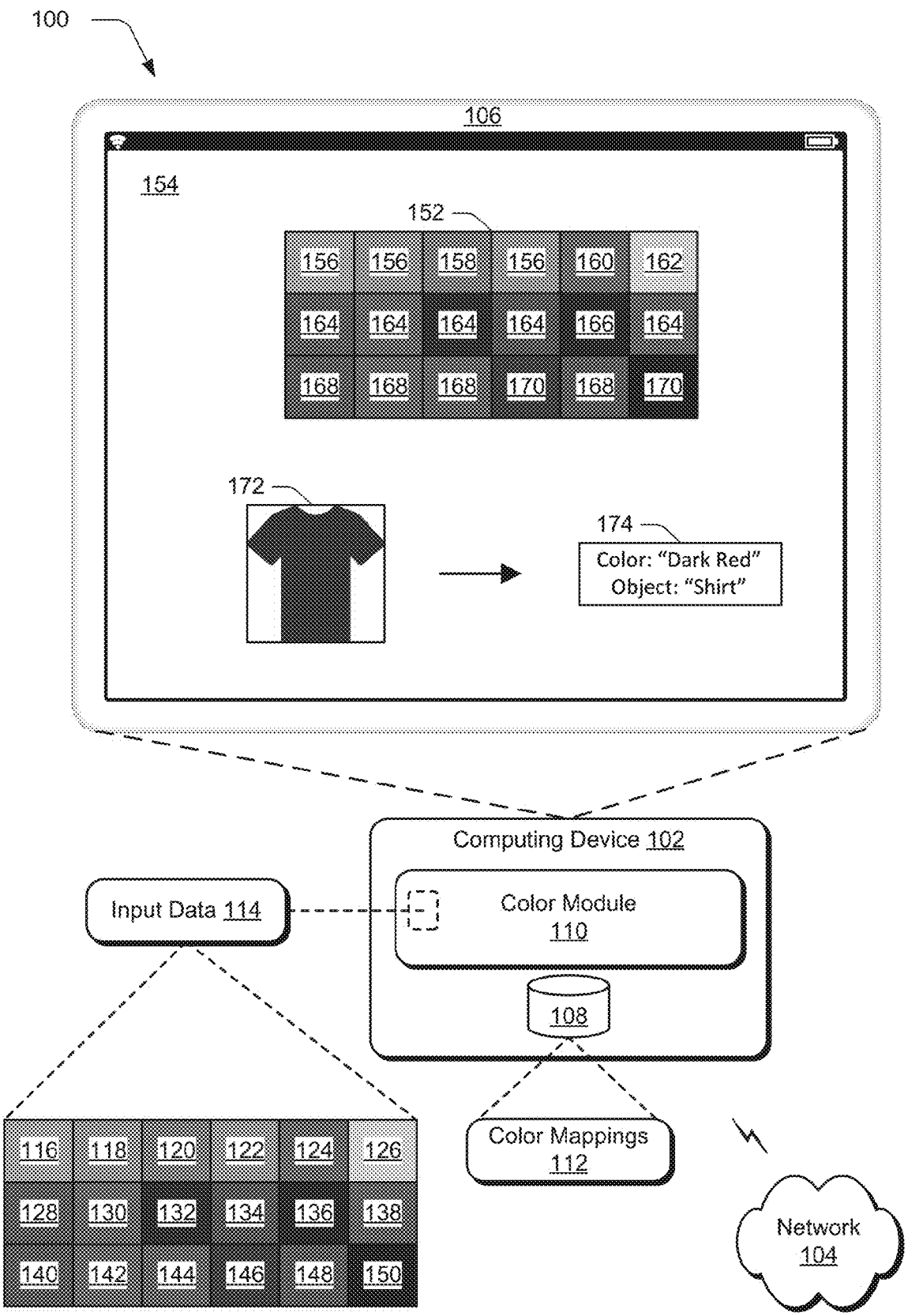
FIG. 1 is an illustration of an environment in an example implementation that is operable to employ digital systems and techniques for generating image metadata using a compact color space as described herein.

Digital images are ubiquitous for communicating information and artistic expression. Because of developments in object recognition/classification, it is possible to generate metadata for digital images describing objects depicted in the digital images automatically without manually labeling (e.g., tagging) the objects depicted in the digital images. By associating the automatically generated metadata with the digital images, it is also possible to identify particular digital images depicting a type of object based on a search input for the type of object. For example, a natural language search input of "shirt" is usable to identify digital images depicting shirts.

However, it is not possible to automatically generate metadata for digital images describing colors depicted in the digital images using conventional systems. This is because of the vast number of colors in an RGB color space (e.g., more than 16 million different colors) that could be depicted in the digital images and also because colors are perceived subjectively (e.g., "0xee195c" is perceivable as "light red" or "pink"). As a result, conventional systems are limited to generating metadata for digital images describing colors depicted in the digital images by manually labeling (e.g., tagging) the colors which is tedious and not practical for databases having large numbers of digital images.

In order to overcome the limitations of conventional systems, techniques and systems are described for generating image metadata using a compact color space. In one example, a computing device implements a color system to receive input data describing pixels of a digital image and corresponding RGB values of the pixels. The color system assigns a color of a compact color space to each of the pixels based on the corresponding RGB values of the pixels. For example, the color system assigns the colors of the compact color space to the pixels using color mappings that map each of the RGB values to a color included in the compact color space. In this example, an RGB color space includes millions of different colors, and the compact color space includes a subset of the colors included in the RGB color space such as 30 colors, 40 colors, 50 colors, etc.

In an example, each color included in the compact color space has a natural language name (e.g., "Red") and a tone of "warm," "neutral," or "cool." The color system computes a histogram of colors of the compact color space assigned to the pixels of the digital image. For example, the histogram indicates how many of the pixels are assigned each color of the compact color space as a percentage of a total number of the pixels. In this example, the histogram also indicates how many of the pixels are assigned colors having a tone of "warm," "neutral," or "cool."

The color system identifies a particular color of the compact color space using the histogram based on a number of the pixels that are assigned the particular color. For example, the particular color is a most frequently assigned color of the colors of the compact color space assigned to the pixels. The color system also identifies a particular tone using the histogram based on a number of the pixels that are assigned colors having the particular tone. In an example, colors of the compact color space having the particular tone are assigned to more of the pixels than colors of the compact color space having one of the other two tones.

The color system generates metadata for the digital image describing a natural language name of the particular color and a percentage of the pixels of the digital image that are assigned the particular color. The color system also generates the metadata as describing a natural language name of the particular tone and a percentage of the pixels of the digital image that are assigned colors having the particular tone. For example, the metadata is usable to identify the digital image in response to receiving an image search input that includes the natural language name of the particular color or the natural language name of the particular tone.

Consider an example in which the natural language name of the particular color is "Red," and the natural language name of the particular tone is "warm." In this example, the color system receives a search input that includes the natural language name of the particular color, and the color system identifies the digital image based on the metadata. The color system displays an indication of the digital image and indications of additional digital images in an order based on the percentage of the pixels of the digital image that are assigned the color "Red" and percentages of pixels of the additional digital images that are assigned the color "Red."

For example, additional metadata generated for the additional digital images describes the percentages of the pixels of the additional digital images that are assigned the color "Red." The color system displays the indication of the digital image and the indications of the additional digital images in an order in which the indication of the digital image is displayed after indications of the additional digital images having greater percentages of the pixels that are assigned the color "Red" than the percentage of the pixels of the digital image that are assigned the color "Red." In one example, the color system displays the indication of the digital image before indications of the additional digital images having smaller percentages of the pixels that are assigned the color "Red" than the percentage of the pixels of the digital image that are assigned the color "Red."

In another example, the color system receives an image search input that includes the natural language name of the particular tone, and the color system identifies the digital image based on the metadata. In this example, the color system displays an indication of the digital image and indications of additional digital images in an order based the percentage of the pixels of the digital image that are assigned colors having the tone "warm" and percentages of pixels of the additional digital images that are assigned colors having the tone "warm." In an example, the additional metadata generated for the additional digital images describes the percentages of the pixels of the additional digital images that are assigned the colors having the tone "warm." The color system displays the indication of the digital image and the indications of the additional digital images in an order in which the indication of the digital image is displayed after indications of the additional digital images having greater percentages of the pixels that are assigned the colors having the tone of "warm" than the percentage of the pixels of the digital image that are assigned the colors having the tone of "warm." In one example, the color system displays the indication of the digital image before indications of the additional digital images having smaller percentages of the pixels that are assigned the colors having the tone of "warm" than the percentage of the pixels of the digital image that are assigned the colors having the tone of "warm."

Consider an example in which a naïve implementation of the color mappings that map each of the RGB values to a color included in the compact color space consumes a substantial amount of memory (e.g., about 512 megabytes of memory) because the RGB color space includes millions of different colors. In this example, in order to reduce an amount of memory consumed by the color mappings, the color system generates compact color mappings based on the color mappings. To do so in one example, the color system quantizes the RGB values in the RGB color space to six bits (e.g., from eight bits). The color system also compresses lookups in a sparse/run-length manner by using index ranges instead of individual index-based lookups because adjacent colors in the RGB color space should map to a same color in the compact color space. For example, the color system then encodes ranges with axes along the R, G, and B dimensions in the RGB color space one at a time. In an example, the color system generates the compact color mappings as storing only start and end indices of the ranges instead of the millions of different colors included in the RGB color space. By only storing the start and end indices in this manner, the color system reduces a size of the color mappings from about 512 megabytes to about 80 kilobytes for the compact color mappings. Thus, the compact color mappings facilitate querying of colors via a network in substantially real time.

By leveraging the color mappings to assign colors of the compact color space to pixels of digital images based on the RGB values of the pixels in this way, the color system is capable of automatically generating metadata describing colors and corresponding tones assigned to the pixels of the digital images. This is not possible using conventional systems that are limited to identifying RGB values of pixels of a digital image. Further, because the color system generates the metadata for the digital images as describing the natural language names of the colors/tones included in the compact color space, the generated metadata facilitates natural language searches for the colors/tones assigned to the pixels of the digital images. This is also not possible using conventional systems that are limited to identifying RGB values of pixels using hexadecimal numbers or codes which are not suitable for implementing natural language searches.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For instance, the computing device 102 includes a storage device 108 and a color module 110. The storage device 108 is illustrated to include color mappings 112 which describe colors of an RGB color space and corresponding colors of a compact color space.

The compact color space includes a subset of colors included in the RGB color space. For example, the RGB color space includes millions of colors, and the compact color space includes 30 colors, 40 colors, 50 colors, etc. In this example, the color mappings 112 associate each of the colors included in the RGB color space with one color included in the compact color space.

Unlike the colors of the RGB color space which are each associated with a hexadecimal number or code, e.g., "0xf00f0f," the colors of the compact color space are each associated with a natural language name, e.g., "red." Although the color mappings 112 are described as mapping from the colors included in the RGB color space to the colors included in the compact color space, it is to be appreciated that in some examples, the color mappings 112 associate colors of other color spaces with the colors included in the compact color space. For example, the color mappings 112 map to the colors included in the compact color space from colors included in a CIELAB color space, an HSL color space, an HSV color space, a CMYK color space, and so forth. In some examples, the colors of the other color spaces map directly to the colors included in the compact color space. In other examples, the colors of the other color spaces map to the colors included in the RGB color space which map to the colors included in the compact color space.

The color module 110 is illustrated as having, receiving, and/or transmitting input data 114 describing pixels of a digital image and corresponding RGB values 116-150 of the pixels. For example, RGB value 116 is "0x66ff33;" RGB value 118 is "0x3aea00;" RGB value 120 is "0x2fb900;" RGB value 122 is "0x3df200;" RGB value 124 is "0x339933;" and RGB value 126 is "0xbfffaa." In this example, RGB value 128 is "0x7f6000;" RGB value 130 is "0x996633;" RGB value 132 is "0x663300;" RGB value 134 is "0x994d00;" RGB value 136 is "0x56391d;" and RGB value 138 is "0xac5600." Continuing this example, RGB value 140 is "0xff0000;" RGB value 142 is "0xff3c3c;" RGB value 144 is "0xff3300;" RGB value 146 is "0xa82200;" RGB value 148 is "0xff1515;" and RGB value 150 is "0x731700."

For instance, the color module 110 receives and processes the input data 114 using the color mappings 112 to assign a color of the compact color space to each of the pixels of the digital image based on the corresponding RGB values 116-150 of the pixels. As shown, the color module 110 generates indications 152 of the assignments which are displayed in a user interface 154 of the display device. For example, the color module 110 assigns color 156 which is "Bright_Green" in the compact color space to a pixel having the RGB value 116; a pixel having the RGB value 118; and a pixel having the RGB value 122. The color module 110 assigns color 158 which is "Green" in the compact color space to a pixel having the RGB value 120. Similarly, the color module 110 assigns color 160 "Dark_Green" to a pixel having the RGB value 124 and assigns color 162 "Light Green" to a pixel having the RGB value 126.

As further shown, the color module 110 assigns color 164 which is "Brown" in the compact color space to a pixel having the RGB value 128; a pixel having the RGB value 130; a pixel having the RGB value 132; a pixel having the RGB value 134; and a pixel having the RGB value 138. The color module 110 assigns color 166 which is "Dark_Brown" in the compact color space to a pixel having the RGB value 136. For instance, the color module 110 assigns color 168 "Red" to a pixel having the RGB value 140; a pixel having the RGB value 142; a pixel having the RGB value 144; and a pixel having the RGB value 148. Finally, the color module 110 assigns color 170 which is "Dark_Red" in the compact color space to a pixel having the RGB value 146 and a pixel having the RGB value 150.

After assigning the colors 156-170 of the compact color space to the pixels of the digital image described by the input data 114, the color module 110 computes a histogram of the colors 156-170 and a tone histogram for tones of the colors 156-170. In an example, each color included in the compact color space is associated with a tone of "warm," "neutral," or "cool." For example, the colors 156-162 have a "cool" tone; the colors 164, 166 have a "neutral" tone; and the colors 168, 170 have a "warm" tone.

The histogram indicates how many of the pixels are assigned each of the colors 156-170 as well as percentages of the pixels of the digital image that are assigned each of the colors 156-170. The tone histogram indicates how many pixels of the digital image are assigned colors of the compact color space having "warm," "neutral," and "cool" tones as well as percentages of the pixels of the digital image that are assigned colors having each of the three tones. For example, the color module 110 generates metadata (e.g., color metadata, tone metadata, etc.) for the digital image describing the natural language names of the colors 156-170, the histogram, and the tone histogram.

Using this metadata, it is possible to identify colors of the compact color space assigned to the pixels based on corresponding RGB colors depicted in the digital image using the natural language names of the colors 156-170. Consider an example of a digital image 172 that depicts an object colored "Dark_Red." The object is a "Shirt" which is identifiable using other metadata, object detection/classification techniques, and so forth. However, using the metadata generated by the color module 110, it is also possible to identify a color of the "Shirt" which is shown in an indication 174. The indication 174 states "Color: Dark Red" and "Object: Shirt."

Consider another example in which the metadata generated by the color module 110 facilitates natural language color-based searches for images or objects depicted in the images. This is not possible in conventional systems that are limited to identifying RGB colors by a hexadecimal number or code, e.g., "0xf00f0f." Furthermore, once the metadata is generated for the images and associated with the images, the color module 110 is capable of displaying results of natural language color-based searches for colors or tones based on amounts of the colors or tones included in the images. For example, in response to receiving a natural language search for "Dark_Red," the color module 110 displays an indication of the digital image 172 before an indication of a digital image having a lower percentage of pixels assigned the color 170 than the digital image 172 which is also not possible in conventional systems.

In another example, the metadata generated by the color module 110 is usable to label training data for training a machine learning model to perform a task which leverages the natural language names of the colors included in the compact color space. As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, transformers, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

By using the metadata generated by the color module 110 to generate labeled training data which can also be labeled with additional information (e.g., object classifications, intents, etc.) it is possible for the machine learning models to infer relationships that are not possible to infer without the metadata generated by the color module 110. For example, after training the machine learning models on the labeled training data, it is possible for the trained models to infer distributions of the colors included in the compact color space that are associated with specific sentiments and/or combinations of objects and colors of the compact color space that are associated with the specific sentiments. In one example, the metadata generated by the color module 110 is usable to generate training data based on digital templates and the trained machine learning models recommend colors included in the compact color space for using in an input digital template based on a user-specified metric.

Figure 2:
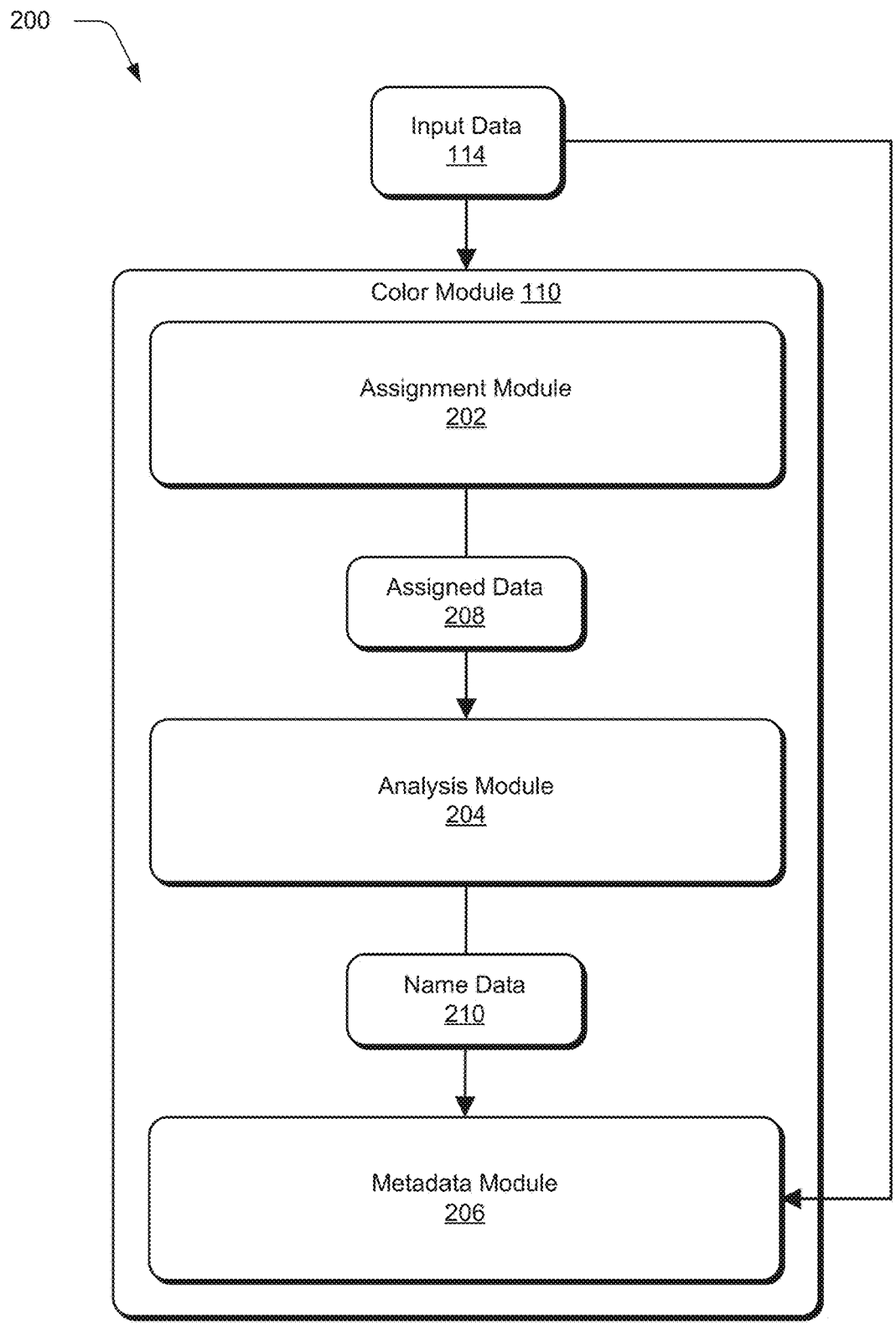
FIG. 2 depicts a system in an example implementation showing operation of a color module for generating image metadata using a compact color space.

FIG. 2 depicts a system 200 in an example implementation showing operation of a color module 110. The color module 110 is illustrated to include an assignment module 202, and analysis module 204, and a metadata module 206. For instance, the assignment module 202 receives and processes the input data 114 to generate assigned data 208.

Figure 3:
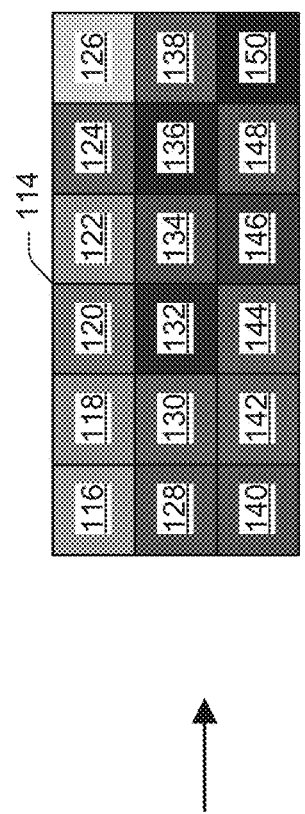
FIG. 3 illustrates a representation of input data.
Figure 3:
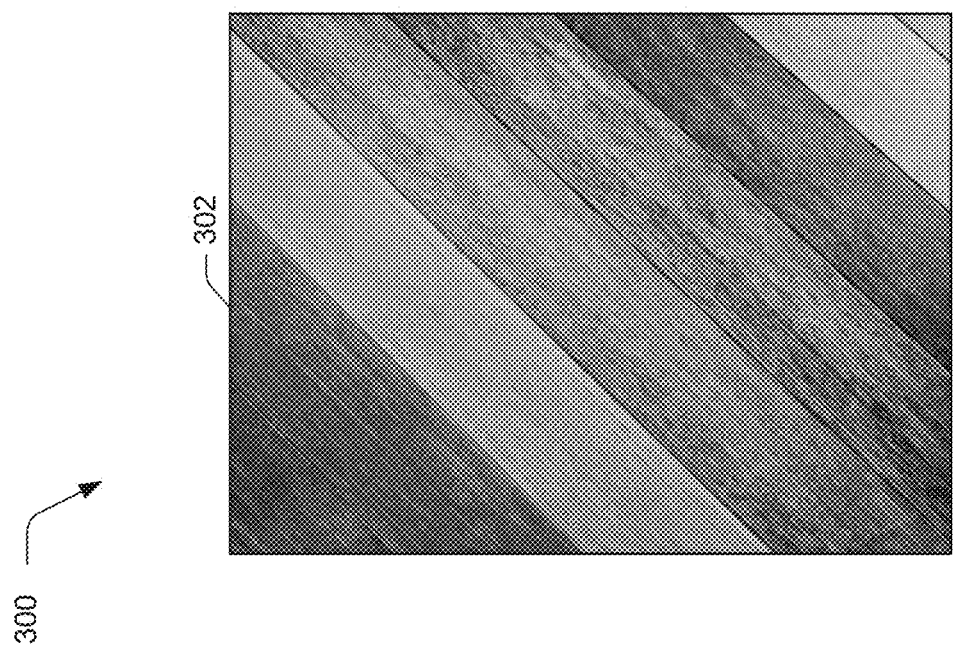

FIG. 3 illustrates a representation 300 of input data 114. As shown, the representation 300 includes a digital image 302 and the input data 114 describes pixels of the digital image 302 and corresponding RGB values 116-150 of the pixels. Although the input data 114 is illustrated as including 18 pixels of the digital image 302, it is to be appreciated that the digital image 302 includes millions of pixels which are each capable of having a different color of the millions of colors included in the RGB color space.

Figure 4:
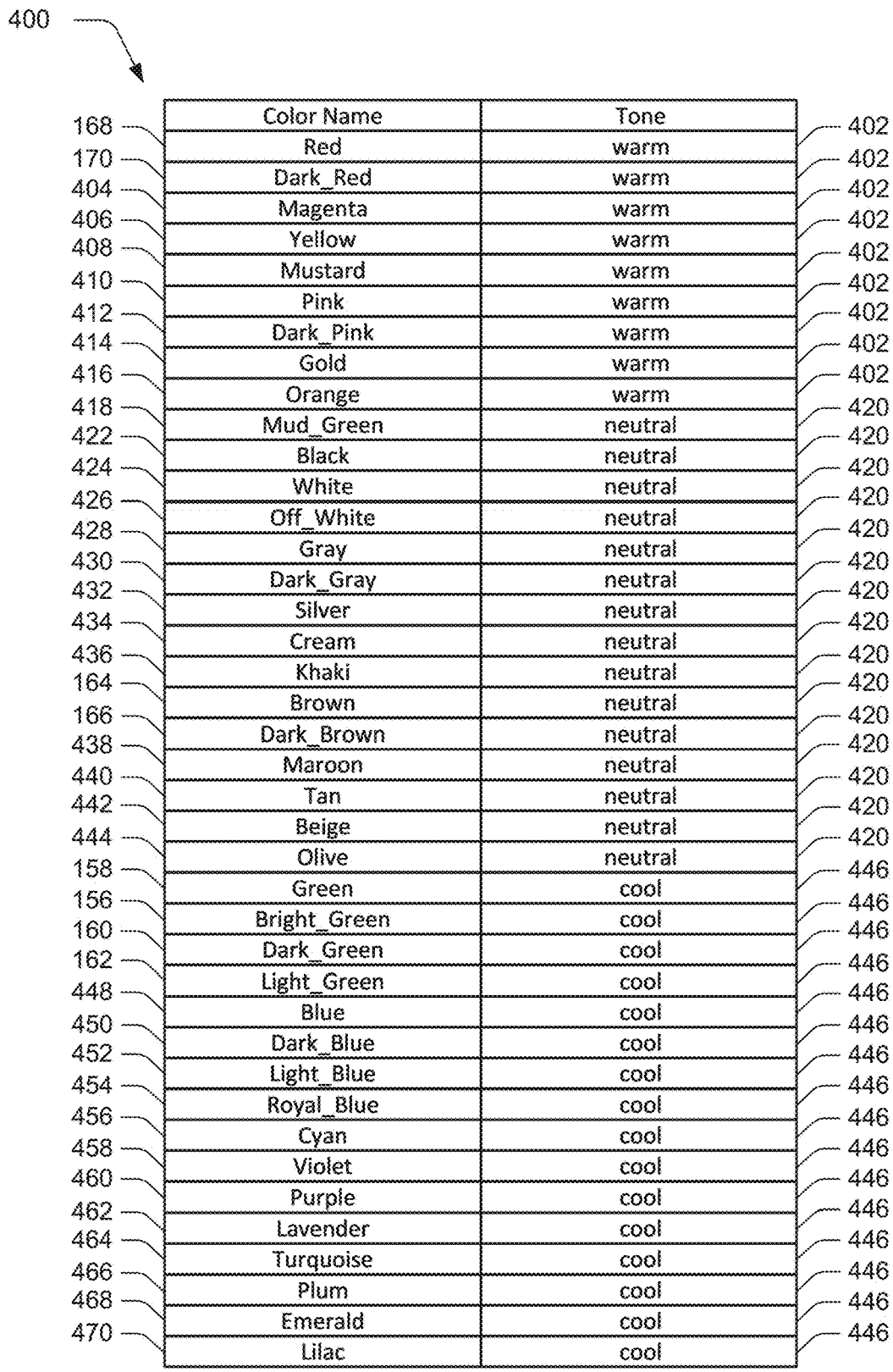
FIG. 4 illustrates a representation of colors and tones included in a compact color space.

FIG. 4 illustrates a representation 400 of colors and tones included in a compact color space. The compact color space includes the color 168 "Red" which has a tone 402 of "warm." For instance, the color 170 "Dark_Red" also has the tone 402 of "warm." As shown in the representation 400, colors 404-416 of the compact color space each have the tone 402 of "warm." A natural language name associated with color 404 is "Magenta;" a natural language name associated with color 406 is "Yellow;" a natural language name associated with color 408 is "Mustard;" a natural language name associated with color 410 is "Pink;" a natural language name associated with color 412 is "Dark_Pink;" a natural language name associated with color 414 is "Gold;" and a natural language name associated with color 416 is "Orange."

For example, color 418 which is "Mud_Green" in the compact color space has a tone 420 of "neutral." As further shown in the representation 400, colors 422-436 each have the tone 420 of "neutral." Color 422 has a natural language name of "Black;" color 424 has a natural language name of "White;" color 426 has a natural language name of "Off White;" color 428 has a natural language name of "Gray;" color 430 has a natural language name of "Dark_Gray;" color 432 has a natural language name of "Silver;" color 434 has a natural language name of "Cream;" and color 436 has a natural language name of "Khaki." The colors 164, 166 each have the tone 420 of "neutral" as described previously. Similarly, color 438 which is "Maroon" has the tone 420 of "neutral;" color 440 which is "Tan" has the tone 420 of "neutral;" color 422 which is "Beige" has the tone 420 of "neutral;" and color 424 which is "Olive" has the tone 420 "neutral."

The colors 158-162 each have a tone 446 of "cool" in the compact color space, and colors 448-470 also each have the tone 446 of "cool" in the compact color space. For instance, a natural language name for color 448 is "Blue;" a natural language name for color 450 is "Dark_Blue;" a natural language name for color 452 is "Light Blue;" a natural language name for color 454 is "Royal_Blue;" a natural language name for color 456 is "Cyan;" a natural language name for color 458 is "Violet;" a natural language name for color 460 is "Purple;" a natural language name for color 462 is "Lavender;" a natural language name for color 464 is "Turquoise;" a natural language name for color 466 is "Plum;" a natural language name for color 468 is "Emerald;" and a natural language name for color 470 is "Lilac."

Figure 5:
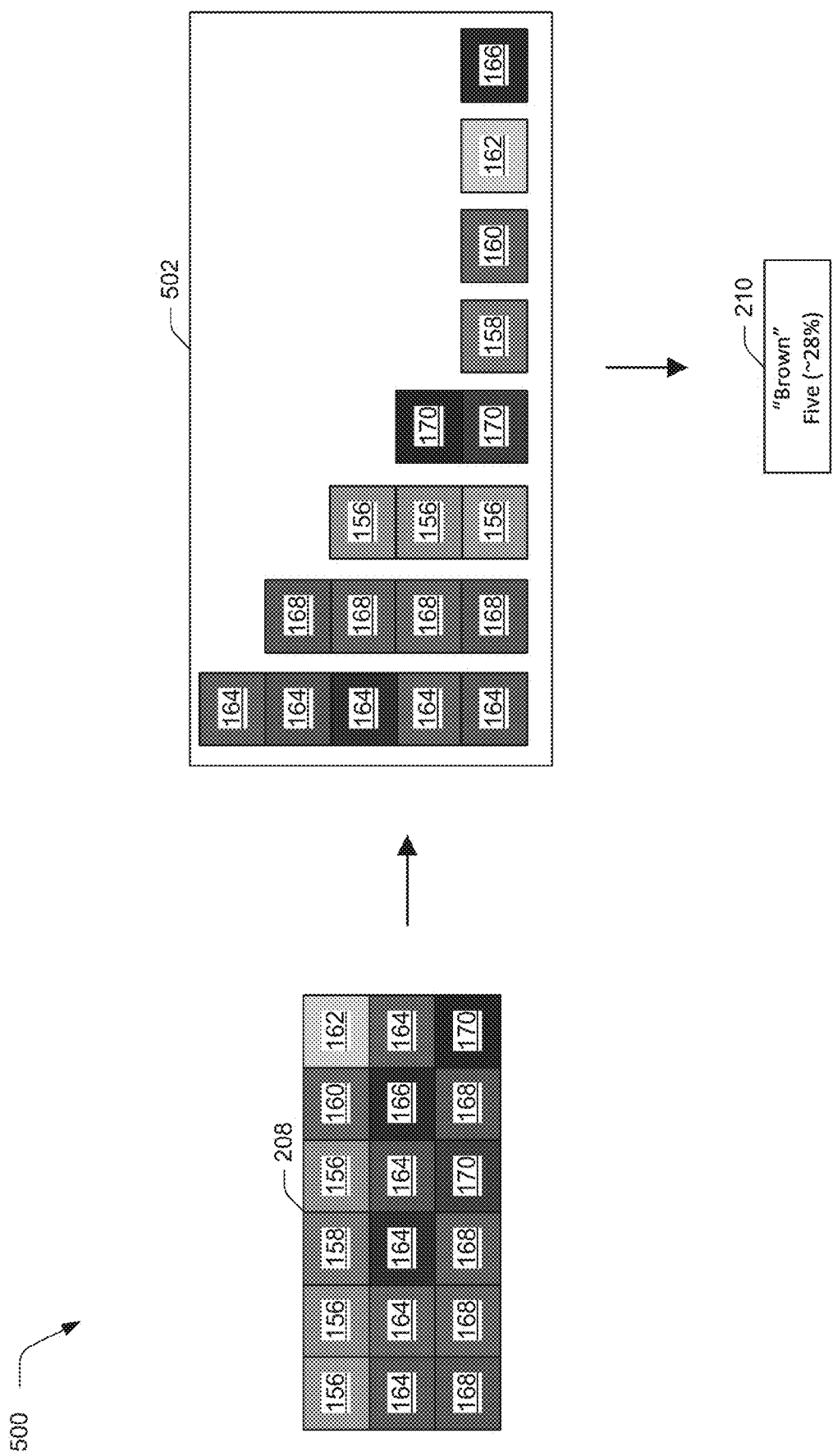
FIG. 5 illustrates a representation of generating a color histogram for a digital image using a compact color space.

In an example, the assignment module 202 receives and processes the input data 114 using the color mappings 112 to assign a color 156-170, 404-418, 422-444, 448-470 of the compact color space to each of the pixels of the digital image based on the corresponding RGB values 116-150 of the pixels. FIG. 5 illustrates a representation 500 of generating a color histogram for a digital image using a compact color space. As illustrated in the representation 500, the assignment module 202 generates the assigned data 208 as describing the color 156 assigned to the pixels having the RGB values 116, 118, 122; the color 158 assigned to the pixel having the RGB value 120; the color 160 assigned to the pixel having the RGB value 124; the color 162 assigned to the pixel having the RGB value 126; the color 164 assigned to the pixels having the RGB values 128, 130, 132, 134, 138; the color 166 assigned to the pixel having the RGB value 136; the color 168 assigned to the pixels having the RGB values 140, 142, 144, 148; and the color 170 assigned to the pixels having the RGB values 146, 150.

For example, the analysis module 204 receives and processes the assigned data 208 to generate a color histogram 502. The color histogram 502 indicates numbers of the pixels described by the input data 114 that are assigned each of the colors 156-170. In some examples, the analysis module 204 excludes colors of the colors 156-170 assigned to less than a threshold number of the pixels from the color histogram 502. As shown, five of the pixels are assigned the color 164 (e.g., about 28 percent of the pixels are assigned the color 164); four of the pixels are assigned the color 168 (e.g., about 22 percent of the pixels are assigned the color 168); three of the pixels are assigned the color 156 (e.g., about 17 percent of the pixels are assigned the color 156); two of the pixels are assigned the color 170 (e.g., about 11 percent of the pixels are assigned the color 170); one of the pixels is assigned the color 158 (e.g., about 6 percent of the pixels are assigned the color 158); one of the pixels is assigned the color 160 (e.g., about 6 percent of the pixels are assigned the color 160); one of the pixels is assigned the color 162 (e.g., about 6 percent of the pixels are assigned the color 162); and one of the pixels is assigned the color 166 (e.g., about 6 percent of the pixels are assigned the color 166).

The analysis module 204 utilizes the color histogram 502 to identify a color or multiple colors of the colors 156-170. In one example, the analysis module 204 identifies a particular color of the colors 156-170 that is assigned to a greatest number of the pixels of the digital image 302. In this example, the analysis module 204 generates name data 210 describing the color 164 which is "Brown" as well as the number of pixels that are assigned the color 164 which is five. The analysis module 204 identifies the color 164 as having a maximum distribution in the color histogram 502. For example, the analysis module 204 also generates the name data 210 as describing the percentage of the pixels that are assigned the color 164 which is about 28 percent. By generating the name data 210 in this manner, it is possible to display the digital image 302 ordered relative to other digital images based on percentages of pixels included in the other digital images that are assigned the color 164 "Brown." For instance, one of the other digital images having more than 28 percent of its pixels assigned the color 164 is displayable before the digital image 302 and a different one of the other digital images having less than 28 percent of its pixels assigned the color 164 is displayable after the digital image 302.

Consider an example in which the analysis module 204 utilizes the color histogram 502 to identify multiple colors of the colors 156-170. In this example, analysis module 204 identifies all of the colors 156-170, a top-k most prominent colors of the colors 156-170 (e.g., k is user specifiable), or colors of the colors 156-170 having distributions greater than a user specified threshold distribution in the color histogram 502. In an example of identifying the top-k most prominent colors of the colors 156-170 in which a user specifies a value of k=3, the analysis module 204 generates the name data 210 as describing the color 164 which is "Brown," the color 168 which is "Red," and the color 156 which is "Bright_Green." In an example of identifying colors of the colors 156-170 having distributions greater than a user specified threshold distribution of 20 percent, the analysis module 204 generates the name data 210 as describing the color 164 which is "Brown" and the color 168 which is "Red."

Figure 6:
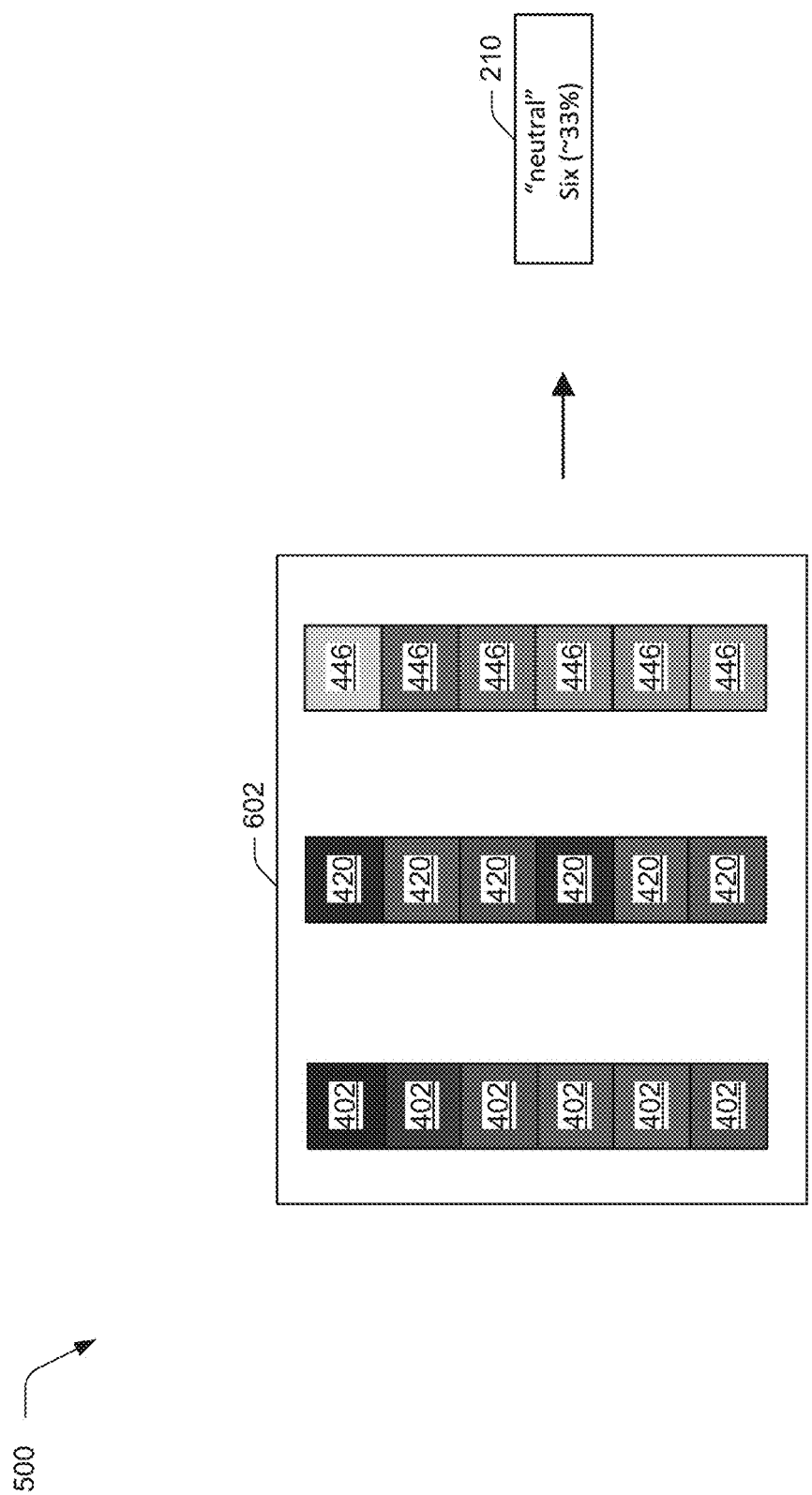
FIG. 6 illustrates a representation of generating a tone histogram for a digital image using a compact color space.

FIG. 6 illustrates a representation 600 of generating a tone histogram for a digital image using a compact color space. For example, the analysis module 204 processes the assigned data 208 to generate a tone histogram 602 that indicates numbers of the pixels of the digital image 302 assigned colors of the compact color space having the tone 402 of "warm;" the tone 420 of "neutral;" and the tone 446 of "cool." In this example, six of the pixels have the tone 402 (e.g., about 33 percent of the pixels have the tone 402); six of the pixels have the tone 420 (e.g., about 33 percent of the pixels have the tone 420); and six of the pixels have the tone 446 (e.g., about 33 percent of the pixels have the tone 446).

In an example in which a greater number of the pixels are assigned colors of the compact color space having the tone 402 than numbers of the pixels assigned colors of the compact color space having the tones 420, 446, the analysis module 204 generates the name data 210 as describing the tone 402 "warm" and a percentage of the pixels assigned the colors having the tone 402. In the illustrated example, the analysis module 204 generates the name data 210 as describing the tone 420 of "neutral" and the number of the pixels assigned the colors having the tone 420 which is six or about 33 percent of the pixels included in the digital image 302. For example, the metadata module 206 receives and processes the name data 210 and the input data 114 which describes the digital image 302 in order to generate metadata for the digital image 302. The metadata describes the color 164 "Brown," the percentage of the pixels included in the digital image 302 that are assigned the color 164 (e.g., about 28 percent of the pixels are assigned the color 164), the tone 420 "neutral," and the percentage of the pixels included in the digital image 302 that are assigned colors of the compact color space having the tone 420 (e.g., about 33 percent of the pixels have the tone 420).

Once generated and associated with the digital image 302, the metadata is usable to identify the digital image 302 based on a search input that includes the natural language name of "Brown." For example, the metadata is also usable to display search results including the digital image 302 ordered relative to additional digital images based on the percentage of the pixels assigned the color 164 "Brown" in the digital image 302 and percentages of pixels assigned the color 164 "Brown" in the additional digital images. Similarly, the metadata is usable to identify the digital image 302 based on a search input that includes the natural language name of "neutral." For instance, the metadata is also usable to display search results including the digital image 302 ordered relative to the additional digital images based on the percentage of the pixels assigned colors of the compact color space having the tone 420 of "neutral" in the digital image 302 and percentages of the pixels assigned colors of the compact color space having the tone 420 of "neutral" in the additional digital images.

Further, although examples are described relative to pixels included in digital images, it is to be appreciated that the described systems for generating image metadata using a compact color space are also capable of generating metadata for objects depicted in the digital images. For example, color module 110 assigns pixels included in a bounding box of an object depicted in a particular digital image colors included in the compact color space and determines a particular color of the compact color space that is assigned to a greatest number of the pixels included in the bounding box. The color module 110 generates metadata for the particular digital image describing the particular color of the compact color space such that the particular digital image is identifiable as depicting the object in response to search inputs which include a natural language name of the particular color. Conventional systems that are limited to identifying colors in the RGB color space using the hexadecimal numbers or codes (e.g., "0xf00f0f") or determining color similarity based on distances between color coordinates are not capable of implementing natural language based searches for colors included in digital images or objects depicted in the digital images. The reason for this is because the color mappings 112 are not available to associate natural language names with the hexadecimal numbers or codes in the conventional systems.

Figure 7:
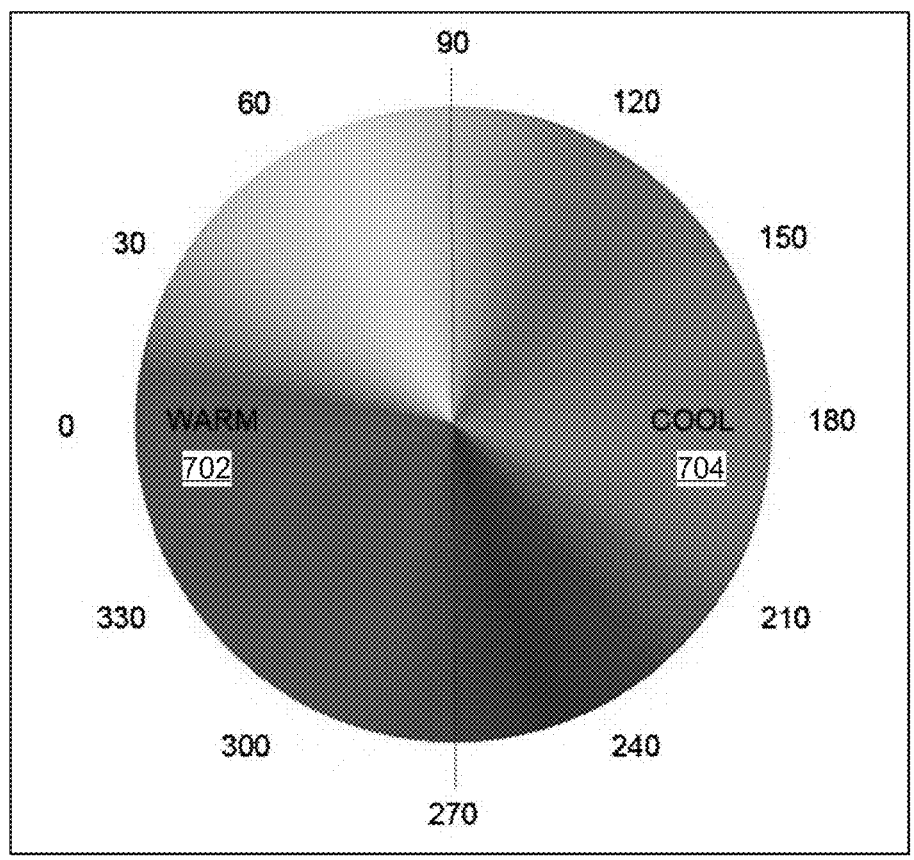
FIG. 7 illustrates a representation of a color wheel for specifying colors in an RGB color space that are mappable to colors of a compact color space.

FIG. 7 illustrates a representation 700 of a color wheel for specifying colors in an RGB color space that are mappable to colors of a compact color space. As shown in the representation 700, the color wheel identifies colors 702 in the RGB color space which map to colors in the compact color space having the tone 402 of "warm." The color wheel also identifies colors 704 in the RGB color space which map to colors in the compact color space having the tone 446 of "cool." In addition to using the color mappings 112 to assign colors of the compact color space to pixels based on RGB values of the pixels, the color module 110 is also capable of receiving a search input describing an RGB value of a color in the RGB color space and performing an image search for a corresponding color in the compact color space. However, because of the millions of different colors included in the RGB color space, a naïve implementation of the color mappings 112 consumes about 512 megabytes of memory which is not practical for client devices such as smartphones.

In order to enable the described systems for generating image metadata using a compact color space for such client devices, the color module 110 generates compact color mappings based on the color mappings 112. For instance, when the color module 110 is implemented by the computing device 102 of such a client device, the color module 110 causes the compact color mappings to be used for generating image metadata. To do so in one example, the color module 110 quantizes the RGB values in the RGB color space to six bits (e.g., from eight bits). The color module 110 then compresses lookups in a sparse/run-length manner by using index ranges instead of individual index-based lookups because adjacent colors in the RGB color space should map to a same color in the compact color space. For example, "0xf00f0f" and "0xf0f0e" both map to the color 168 "Red." The color module 110 then encodes ranges with axes along the R, G, and B dimensions in the RGB color space one at a time. In an example, "0xf00f00" to "0xf00f0f" along the B dimension maps to the color 168 "Red," so rather than storing 16 values, the color module 110 generates the compact color mappings as storing start and end indices. By only storing start and end indices in this manner, the color module 110 reduces a size of the color mappings 112 from about 512 megabytes to about 80 kilobytes for the compact color mappings. For instance, the compact color mappings are usable to query colors via the network 104 in substantially real time. In one example, the compact color mappings are usable to query colors via the network 104 at a time of color-based filtering of assets as part of a digital asset management system.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 8:
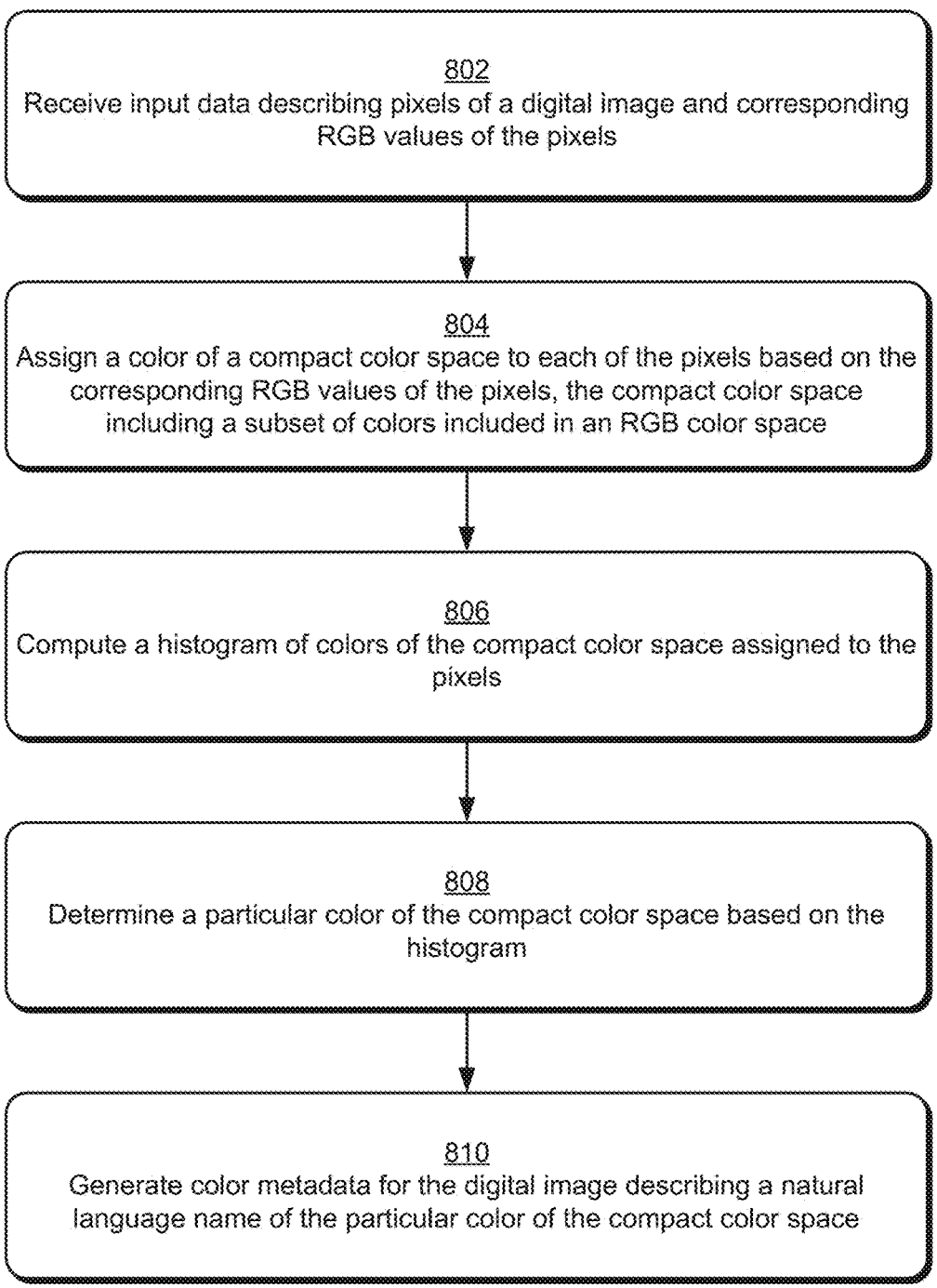
FIG. 8 is a flow diagram depicting a procedure in an example implementation in which color metadata is generated for a digital image describing a natural language name of a particular color of a compact color space.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7. FIG. 8 is a flow diagram depicting a procedure 800 in an example implementation in which color metadata is generated for a digital image describing a natural language name of a particular color of a compact color space.

Input data is received describing pixels of a digital image and corresponding RGB values of the pixels (block 802). For example, the computing device 102 implements the color module 110 to receive the input data. A color of a compact colors space is assigned to each of the pixels based on the corresponding RGB values of the pixels, the compact color space including a subset of colors included in an RGB color space (block 804). In some examples, the color module 110 assigns colors of the compact color space to the pixels.

A histogram of colors of the compact color space assigned to the pixels is computed (block 806). In an example, the computing device 102 implements the color module 110 to compute the histogram. A particular color of the compact color space is determined based on the histogram (block 808). The color module 110 determines the particular color in one example. Color metadata is generated for the digital image describing a natural language name of the particular color of the compact color space (block 810). For example, the color module 110 generates the color metadata for the digital image.

Figure 9:
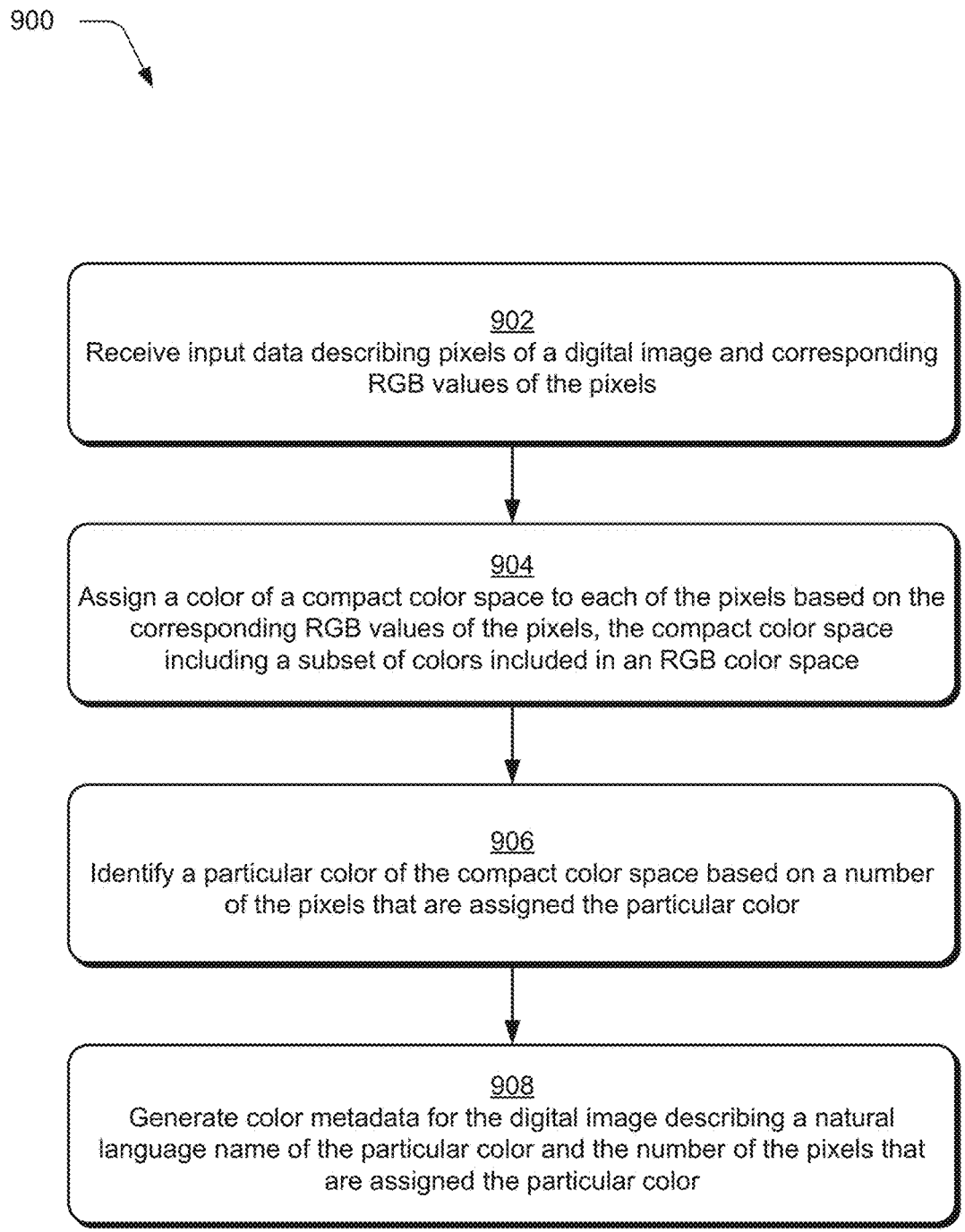
FIG. 9 is a flow diagram depicting a procedure in an example implementation in which color metadata is generated for a digital image describing a natural language name of a particular color of a compact color space and a number of pixels of the digital image that are assigned the particular color.

FIG. 9 is a flow diagram depicting a procedure 900 in an example implementation in which color metadata is generated for a digital image describing a natural language name of a particular color of a compact color space and a number of pixels of the digital image that are assigned the particular color. Input data is received describing pixels of a digital image and corresponding RGB values of the pixels (block 902). In an example, the computing device 102 implements the color module 110 to receive the input data. A color of a compact color space is assigned to each of the pixels based on the corresponding RGB values of the pixels, the compact color space including a subset of colors included in an RGB color space (block 904). For example, the color module 110 assigns colors of the compact color space to the pixels.

A particular color of the compact color space is identified based on a number of the pixels that are assigned the particular color (block 906). In one example, the computing device 102 implements the color module 110 to identify the particular color. Color metadata is generated for the digital image describing a natural language name for the particular color and the number of the pixels that are assigned the particular color (block 908). In some examples, the color module 110 generates the color metadata for the digital image.

Example System and Device

Figure 10:
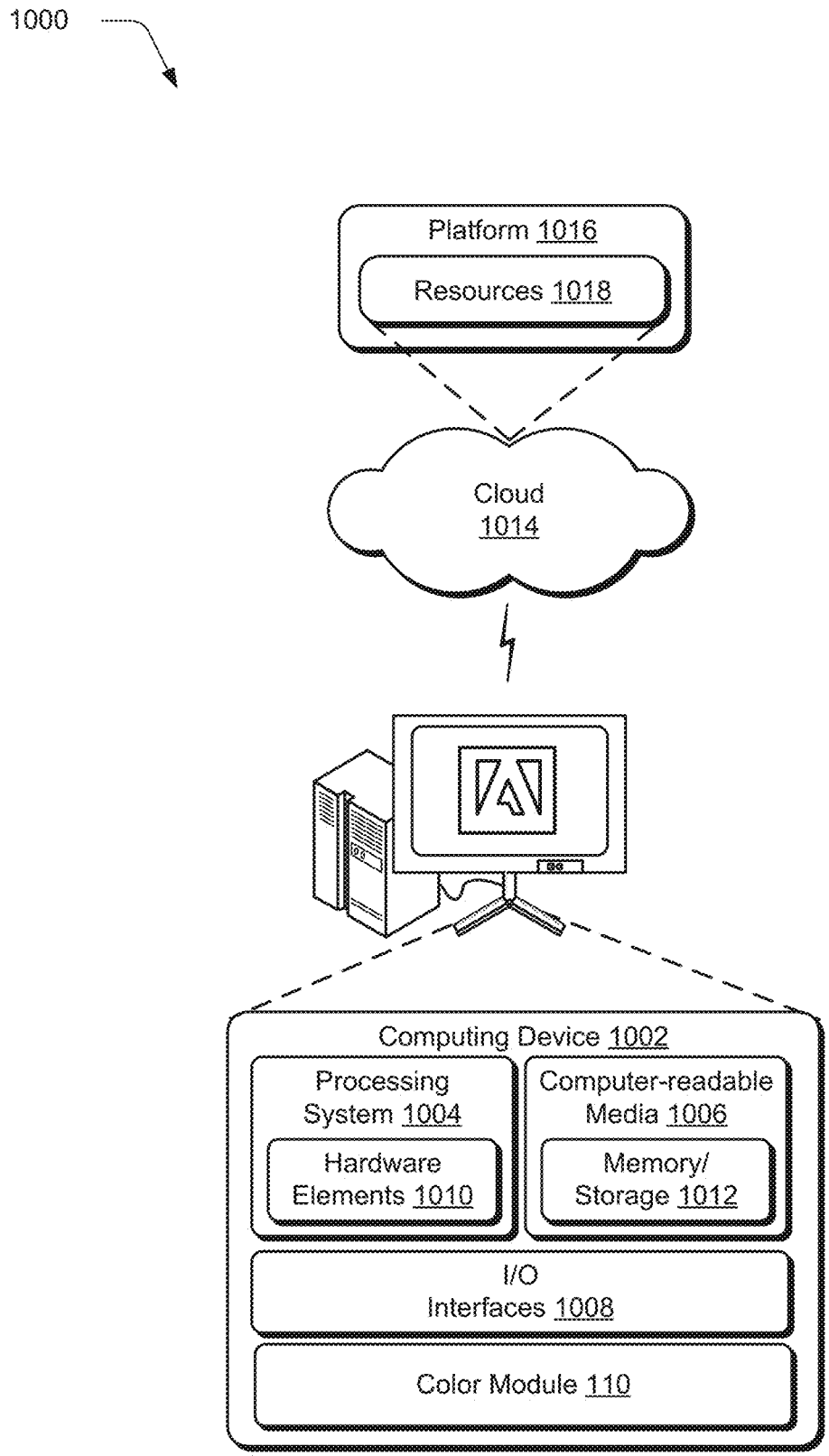
FIG. 10 illustrates an example system that includes an example computing device that is representative of one or more computing systems and/or devices for implementing the various techniques described herein.

FIG. 10 illustrates an example system 1000 that includes an example computing device that is representative of one or more computing systems and/or devices that are usable to implement the various techniques described herein. This is illustrated through inclusion of the color module 110. The computing device 1002 includes, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that are configured as processors, functional blocks, and so forth. This includes example implementations in hardware as an application specific integrated circuit or other logic device formed using one or more semiconductors. The hardware elements 1010 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1006 is illustrated as including memory/storage 1012. The memory/storage 1012 represents memory/storage capacity associated with one or more computer-readable media. In one example, the memory/storage 1012 includes volatile media (such as random access memory (RAM)) and/or nonvolatile media (such as read only memory (ROM), Flash memory, optical disks, magnetic disks, and so forth). In another example, the memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1010. For example, the computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supportable by various configurations of the computing device 1002 and are not limited to the specific examples of the techniques described herein. This functionality is also implementable entirely or partially through use of a distributed system, such as over a "cloud" 1014 as described below.

The cloud 1014 includes and/or is representative of a platform 1016 for resources 1018. The platform 1016 abstracts underlying functionality of hardware (e.g., servers) and software resources of the cloud 1014. For example, the resources 1018 include applications and/or data that are utilized while computer processing is executed on servers that are remote from the computing device 1002. In some examples, the resources 1018 also include services provided over the Internet and/or through a subscriber network, such as a cellular or Wi-Fi network.

The platform 1016 abstracts the resources 1018 and functions to connect the computing device 1002 with other computing devices. In some examples, the platform 1016 also serves to abstract scaling of resources to provide a corresponding level of scale to encountered demand for the resources that are implemented via the platform. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

Conclusion

Although implementations of systems for generating image metadata using a compact color space have been described in language specific to structural features and/or methods, it is to be understood that the appended claims are not necessarily limited to the specific features or methods described. Rather, the specific features and methods are disclosed as example implementations of systems for generating image metadata using a compact color space, and other equivalent features and methods are intended to be within the scope of the appended claims. Further, various different examples are described and it is to be appreciated that each described example is implementable independently or in connection with one or more other described examples.

What is claimed is:

1. A method comprising:
receiving, by a processing device, input data describing pixels of a digital image and corresponding RGB values of the pixels;
assigning, by the processing device, a natural language name of a color of a compact color space to each of the pixels based on the corresponding RGB values of the pixels, the compact color space including a subset of colors included in an RGB color space;
computing, by the processing device, a histogram of colors of the compact color space assigned to the pixels;
determining, by the processing device, a particular color of the compact color space based on the histogram; and
generating, by the processing device, color metadata for the digital image describing the natural language name of the particular color of the compact color space.

2. The method as described in claim 1, further comprising:
receiving a search input that includes the natural language name of the particular color of the compact color space; and
generating an indication of the digital image for display in a user interface based on the color metadata.

3. The method as described in claim 1, wherein the color metadata describes a percentage of the pixels that are assigned the particular color of the compact color space.

4. The method as described in claim 1, further comprising:
computing a tone histogram of the colors of the compact color space assigned to the pixels;
determining a particular tone based on the tone histogram; and
generating tone metadata for the digital image describing the particular tone.

5. The method as described in claim 1, wherein the particular color has a maximum distribution in the histogram of the colors of the compact color space assigned to the pixels.

6. The method as described in claim 1, further comprising:
receiving a search input that includes an RGB value of the RGB color space specified relative to a representation of a color wheel;
identifying the particular color of the compact color space based on the RGB value and color mappings; and
generating search results for display in a user interface, the search results including the digital image and additional digital images ordered based on a number of the pixels that are assigned the particular color of the compact color space.

7. The method as described in claim 6, wherein the color mappings quantize the RGB color space.

8. The method as described in claim 1, wherein the pixels include every pixel of the digital image and the particular color is associated with the digital image.

9. The method as described in claim 1, wherein the pixels include every pixel in a bounding box of an object depicted in the digital image and the particular color is associated with the object.

10. A system comprising:
a memory component; and
a processing device coupled to the memory component, the processing device to perform operations comprising:
receiving input data describing pixels of a digital image and corresponding RGB values of the pixels;
assigning a color of a compact color space to each of the pixels based on the corresponding RGB values of the pixels, the compact color space including a subset of colors included in an RGB color space;

identifying a particular color of the compact color space based on a number of the pixels that are assigned the particular color;

generating color metadata for the digital image describing a natural language name of the particular color and the number of the pixels that are assigned the particular color;

computing a tone histogram of colors of the compact color space assigned to the pixels;

determining a particular tone based on the tone histogram; and generating tone metadata for the digital image describing the particular tone.

11. The system as described in claim 10, wherein the operations further comprise:

receiving a search input that includes the natural language name of the particular color; and generating search results for display in a user interface, the search results including the digital image based on the color metadata.

12. The system as described in claim 11, wherein the search results include additional digital images ordered based on the number of the pixels that are assigned the particular color.

13. The system as described in claim 10, wherein the particular tone has a maximum distribution in the tone histogram.

14. The system as described in claim 10, wherein the pixels include every pixel in a bounding box of an object depicted in the digital image and the particular color is associated with the object.

15. A method comprising:

receiving, by a processing device, input data describing pixels of a digital image and corresponding RGB values of the pixels;

assigning, by the processing device, a color of a compact color space to each of the pixels based on the corresponding RGB values of the pixels, the compact color space including a subset of colors included in an RGB color space;

computing, by the processing device, a tone histogram of the colors of the compact color space assigned to the pixels;

determining, by the processing device, a particular tone based on the tone histogram; and generating, by the processing device, tone metadata for the digital image describing the particular tone.

16. The method as described in claim 15, wherein the particular tone has a maximum distribution in the tone histogram.

17. The method as described in claim 15, further comprising:

receiving a search input that includes a natural language name of the particular tone of the compact color space; and generating an indication of the digital image for display in a user interface based on the tone metadata.

18. The method as described in claim 15, wherein the particular tone is warm, neutral, or cool.

19. The method as described in claim 15, wherein each color of the subset of colors has a natural language name.

20. The method as described in claim 19, further comprising:

computing, by the processing device, a histogram of colors of the compact color space assigned to the pixels;

determining, by the processing device, a particular color of the compact color space based on the histogram; and generating, by the processing device, color metadata for the digital image describing the natural language name of the particular color of the compact color space.

* * * * *